US012636930B2

(12) United States Patent
Peterson et al.

(10) Patent No.: US 12,636,930 B2
(45) Date of Patent: May 26, 2026

(54) MODULAR ARCHITECTURE FOR FUEL CELL POWERED TRANSPORT REFRIGERATION

(71) Applicant: Carrier Corporation, Palm Beach Gardens, FL (US)

(72) Inventors: Eric C. Peterson, East Longmeadow, MA (US); Michael Lines, South Windsor, CT (US); Mark Makwinski, Cromwell, CT (US); Stella Maris Oggianu, West Hartford, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 172 days.

(21) Appl. No.: 18/175,655

(22) Filed: Feb. 28, 2023

(65) Prior Publication Data

US 2023/0278393 A1 Sep. 7, 2023

Related U.S. Application Data

(60) Provisional application No. 63/315,303, filed on Mar. 1, 2022.

(51) Int. Cl.
B60H 1/00 (2006.01)
B60H 1/32 (2006.01)
(52) U.S. Cl.
CPC ..... B60H 1/00428 (2013.01); B60H 1/00542 (2013.01); B60H 1/3222 (2013.01); B60H 1/3232 (2013.01)
(58) Field of Classification Search
CPC ............ B60H 1/00428; B60H 1/00542; B60H 1/3232; B60R 16/03
See application file for complete search history.

(56) References Cited

U.S. PATENT DOCUMENTS

| | | | | |
|---|---|---|---|---|
| 7,691,503 | B2 * | 4/2010 | Wallace | H01M 16/003 |
| | | | | 429/423 |
| 8,097,376 | B2 * | 1/2012 | Bai | H01M 8/04074 |
| | | | | 429/456 |
| 10,578,342 | B1 * | 3/2020 | Moromisato | F25B 39/00 |
| 2003/0019231 | A1 | 1/2003 | Wessells et al. | |
| 2011/0008687 | A1 * | 1/2011 | Ballantine | H01M 8/04753 |
| | | | | 73/40.7 |
| 2015/0013361 | A1 * | 1/2015 | Senf, Jr. | B60H 1/3208 |
| | | | | 62/118 |
| 2020/0266463 | A1 * | 8/2020 | Hable | H01M 8/04402 |
| 2020/0391574 | A1 | 12/2020 | Ducher | |

FOREIGN PATENT DOCUMENTS

EP 3756915 A1 * 12/2020 ......... B60H 1/00428

OTHER PUBLICATIONS

Extended European Search Report for European Application No. 23159509.1; Report Mail Date Jul. 19, 2023 (6 Pages).

* cited by examiner

*Primary Examiner* — Lionel Nouketcha
(74) *Attorney, Agent, or Firm* — CANTOR COLBURN LLP

(57) ABSTRACT

A transport refrigeration system including a refrigeration unit for conditioning an area and a power system operably coupled to the refrigeration unit. The power system includes at least one fuel cell and a fuel source. At least a portion of one of the refrigeration unit and the power system is packaged into a replaceable module.

13 Claims, 4 Drawing Sheets

MODULAR ARCHITECTURE FOR FUEL CELL POWERED TRANSPORT REFRIGERATION

CROSS-REFERENCE TO RELATED APPLICATIONS

This application claims the benefit of U.S. Provisional Patent Application No. 63/315,303, filed Mar. 1, 2022, the contents of which are incorporated by reference herein in their entirety.

BACKGROUND

Embodiments of the present disclosure relate to refrigeration systems, and more particularly, to transport refrigeration systems powered by a fuel cell system.

Refrigerated trucks, trailers, and containers are commonly used to transport perishable cargo, such as, for example, produce, meat, poultry, fish, dairy products, cut flowers, vaccines and other fresh or frozen perishable products. Conventionally, transport refrigeration systems include a transport refrigeration unit having a refrigerant compressor, a condenser with one or more associated condenser fans, an expansion device, and an evaporator with one or more associated evaporator fans, which are connected via appropriate refrigerant lines in a closed loop refrigerant circuit. Air or an air/gas mixture is drawn from the interior volume of the cargo box by means of the evaporator fan(s) associated with the evaporator, passed through the airside of the evaporator in heat exchange relationship with refrigerant whereby the refrigerant absorbs heat from the air, thereby cooling the air. The cooled air is then supplied back to the cargo box.

The transport refrigeration unit typically uses power from sources like a diesel engine. In newer systems, the power may be provided from a fuel cell located on board the transport refrigeration system. However, repairs to both the transport refrigeration unit and the fuel cell system can be lengthy and expensive costing a loss in on-road time of the transport refrigeration system as well as a loss of perishable goods being carried therein.

BRIEF DESCRIPTION

According to an embodiment, a transport refrigeration system including a refrigeration unit for conditioning an area and a power system operably coupled to the refrigeration unit. The power system includes at least one fuel cell and a fuel source. At least a portion of one of the refrigeration unit and the power system is packaged into a replaceable module.

In addition to one or more of the features described herein, or as an alternative, in further embodiments the replaceable module includes the at least one fuel cell.

In addition to one or more of the features described herein, or as an alternative, in further embodiments the at least one fuel cell includes a fuel cell stack having a plurality of fuel cell packages and at least one bipolar plate, wherein the replaceable module includes at least a portion of one of the plurality of fuel cell packages.

In addition to one or more of the features described herein, or as an alternative, in further embodiments the at least one fuel cell includes a fuel cell stack having a plurality of fuel cell packages and at least one bipolar plate, wherein the replaceable module includes the at least one bipolar plate.

In addition to one or more of the features described herein, or as an alternative, in further embodiments the replaceable module includes a component of at least one of the refrigeration unit and the power system.

In addition to one or more of the features described herein, or as an alternative, in further embodiments the replaceable module includes the fuel source.

In addition to one or more of the features described herein, or as an alternative, in further embodiments the refrigeration unit further comprises a plurality of components fluidly coupled to form a closed loop refrigeration circuit.

In addition to one or more of the features described herein, or as an alternative, in further embodiments the plurality of components includes a compressor and the replaceable module includes the compressor.

In addition to one or more of the features described herein, or as an alternative, in further embodiments the plurality of components includes at least one heat exchanger and the replaceable module includes the at least one heat exchanger.

In addition to one or more of the features described herein, or as an alternative, in further embodiments the refrigeration unit further comprises a plurality of subsystems and the replaceable module includes at least one of the plurality of sub systems.

In addition to one or more of the features described herein, or as an alternative, in further embodiments the refrigeration unit further comprises an exhaust system and the replaceable module includes at least a portion of the exhaust system.

In addition to one or more of the features described herein, or as an alternative, in further embodiments the exhaust system further comprises at least one fan assembly.

In addition to one or more of the features described herein, or as an alternative, in further embodiments the exhaust system further comprises a source used to condition an exhaust gas of the power system.

In addition to one or more of the features described herein, or as an alternative, in further embodiments the refrigeration unit further comprises an electrical control system and the replaceable module includes the electrical control system.

In addition to one or more of the features described herein, or as an alternative, in further embodiments the refrigeration unit further comprises a power distribution system and the replaceable module includes the power distribution system.

In addition to one or more of the features described herein, or as an alternative, in further embodiments the replaceable module includes a mechanical interface and an electrical interface.

In addition to one or more of the features described herein, or as an alternative, in further embodiments the refrigeration unit includes a plurality of closed loop vapor compression systems, and the replaceable module includes a portion of one of the plurality of closed loop vapor compression systems.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
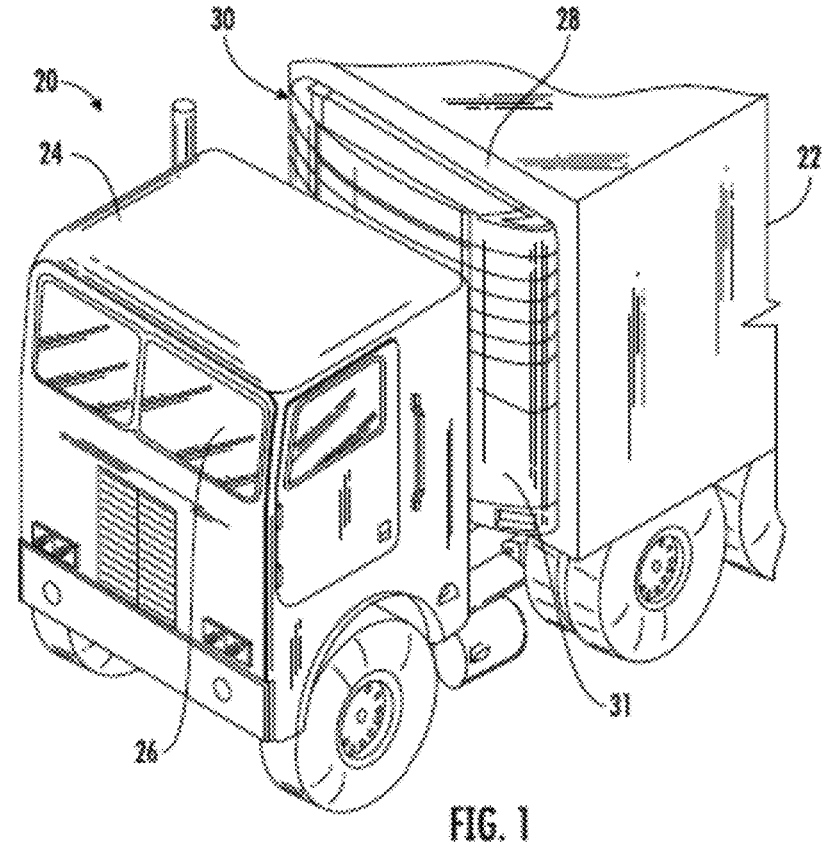
FIG. 1 is a perspective view of an exemplary transport refrigeration system.

With reference now to FIG. 1, an exemplary transport refrigeration system 20 is illustrated. In the illustrated, non-limiting embodiment, the transport refrigeration system 20 is shown as a trailer system. Although described herein that the transport refrigeration system 20 may be a trailer system, it should be appreciated that the transport refrigeration system 20 may be any refrigerated cargo (e.g., trailer, container, unit load device, etc.). As shown, the transport refrigeration system 20, when embodied as a trailer, includes a cargo container or trailer 22 being towed or otherwise transported by a tractor 24 including an operator's compartment or cab 26 and also including an engine (not shown), which acts as the drivetrain system of the transport refrigeration system 20. A transport refrigeration unit 30 is configured to maintain cargo located within the container 22 at a selected temperature by cooling the cargo space of the container 22. As shown, the transport refrigeration unit 30 is typically mounted at the front wall 28 of the container 22. Together, the transport refrigeration unit 30 and the cargo container 22 may form a transport refrigeration system 20. It should be appreciated by those of skill in the art that embodiments described herein may be applied to any transport refrigeration system such as, for example shipping containers that are shipped by rail, sea (via a watercraft), or any other suitable container, without use of a tractor 24.

Figure 2:
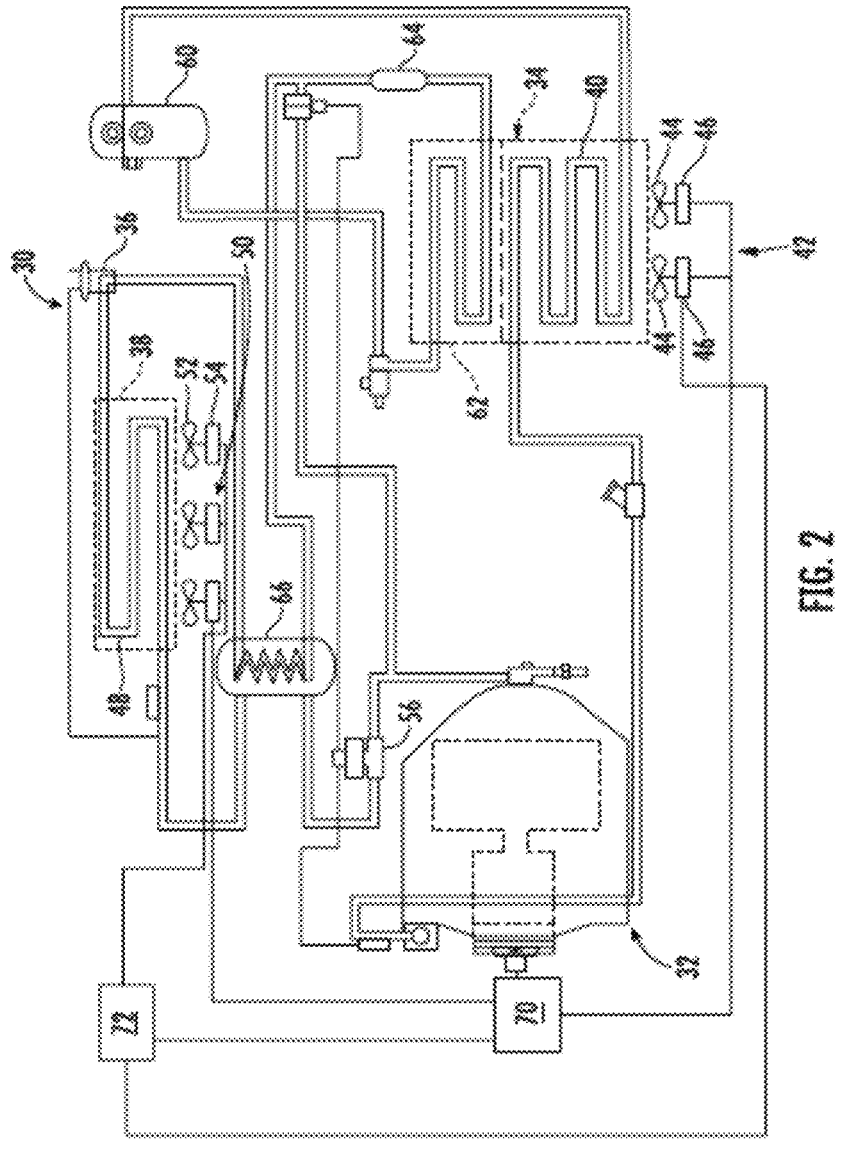
FIG. 2 is a schematic illustration of an exemplary transport refrigeration unit of a transport refrigeration system according to an embodiment.

With reference now to FIG. 2, a schematic diagram of an exemplary transport refrigeration unit 30, such as a trailer refrigeration unit 30 for example, is illustrated. The transport refrigeration unit 30 includes a compressor 32, a heat rejection heat exchanger or condenser 34, an expansion valve 36, and a heat absorption heat exchanger or evaporator 38 fluidly coupled to form a closed loop refrigeration circuit. During operation of the transport refrigeration unit 30, refrigerant R enters the compressor 32 and is compressed to a higher temperature and pressure. From the outlet of the compressor 32, the refrigerant gas is then provided to the condenser 34. In the illustrated, non-limiting embodiment, the condenser 34 is an air cooled condenser such that a flow of air across the condenser coils 40 cools the refrigerant gas R to its saturation temperature. By removing latent heat, the refrigerant gas within the condenser 34 condenses to a high pressure/high temperature liquid. The air flow across the condenser 34 may be energized by a condenser fan assembly 42 including one or more fans 44, such as two fans for example. As shown, each fan 44 may be driven by a separate fan motor 46.

In a transport refrigeration unit 30 having a basic vapor compression cycle, the flow output from the condenser 34 is provided directly to a thermostatic expansion valve 36 and evaporator 38. As the liquid refrigerant R passes through the orifice of the expansion valve 36, some of it vaporizes into a gas. Return air from the refrigerated space flows over the heat transfer surface of an evaporator 38. As refrigerant flows through tubes 48 in the evaporator 38, the remaining liquid refrigerant R absorbs heat from the return air, and in so doing, is vaporized. The air flow across the evaporator 38 may be energized by an evaporator fan assembly 50 including at least one fan 52 and a corresponding fan motor 54. From the evaporator 38, the vapor then flows through a suction modulation valve 56 back to an inlet of the compressor 32. In an embodiment, a thermostatic expansion valve bulb or sensor (not shown) is located at an evaporator outlet tube. The bulb is intended to control the thermostatic expansion valve 36, thereby controlling refrigerant superheating at the evaporator outlet tubing.

In the illustrated, non-limiting embodiment, the transport refrigeration unit 30 includes a plurality of components arranged between the condenser 34 and the expansion valve 36. As shown, a receiver 60 is arranged directly downstream from the outlet of the condenser 34. The receiver 60 is configured to provide storage for excess liquid refrigerant during low temperature operation. From the receiver 60, the liquid refrigerant R may pass through a subcooler heat exchanger 62. The subcooler 62 may be arranged in-line with and downstream from the condenser 34 such that the air flow from the at least one fan assembly 42 moves across the condenser 34 and the subcooler 62 in series. In an embodiment, at the outlet of the subcooler 62, the refrigerant R is provided to a filter dryer 64 that keeps the refrigerant cool and dry, and in some embodiments to a heat exchanger 66 that increases the refrigerant subcooling. In such embodiments, the refrigerant provided at the outlet of this heat exchanger 66 is delivered to the thermostatic expansion valve 36.

It should be understood that in some embodiment, the cargo container may have a plurality of distinct zones formed therein, each zone having a different temperature setpoint. By including multiple zones, perishables having different temperature requirements, such as deep-frozen products and fresh fruits or flowers for example, can be carried at the same time. In such embodiments, the vapor compression cycle of the transport refrigeration unit 30 may include a plurality of branches that extend in parallel, each branch being associated with a respective zone of the container 22. Alternatively, embodiments where the trail refrigeration unit includes a plurality of closed loop vapor compression systems, each of which is associated with a respective zone is also within the scope of the disclosure. In such embodiments, the plurality of closed loop vapor compression systems may, but need not be operably coupled.

In an embodiment, the transport refrigeration unit 30 includes a power system 69 (see FIG. 4) including a power source 70 that is capable of powering all of the electric or electronic components of the transport refrigeration unit 30. Such components include, but are not limited to the electric motor associated with the compressor 32 and the fan motors 46,54 associated with both the condenser 34 and the evaporator 38 fan assemblies 42, 50. In an embodiment, the power source 70 includes at least one fuel cell, such as a single fuel cell, or alternatively a plurality of fuel cells, suitable to provide enough power for all of the power consuming components of the transport refrigeration unit 30. The fuel cell 70 may be a direct current (DC) power source; however, in an embodiment, the fuel cell is part of a system including power electronics that are able to convert the DC power to alternating current (AC) power as needed. It should be understood that embodiments where the power system 69 includes a plurality of different types of power sources, including but not limited to as a battery, a gas or diesel engine, and/or a fuel cell for example, are also contemplated herein. In such embodiments, the power system 69 may be considered a hybrid power system.

The power source 70 may be located remotely from the remainder of the refrigeration unit 30, such as at a location underneath the trailer 22 for example, or alternatively, may be arranged within the housing 31 (FIG. 1) of the refrigeration unit 30. However, a power source located at any suitable position onboard the transport refrigeration system 20 is contemplated herein. Further, the system may additionally include a back-up or secondary power source located remotely from the transport refrigeration unit 30, or from the transport refrigeration system 20.

A controller 72, such as a microprocessor, may be programmed to control power usage and the operation of various electrically powered components within the transport refrigeration system 20. For example, the controller 72 may be operable to regulate the power supplied to the condenser fan motors 46 and the evaporator fan motors 54. Programming such controllers is within the skill in the art.

In an embodiment, the power source 70 includes at least one hydrogen fuel cell, and in some embodiments, a plurality of hydrogen fuel cells. As is known in the art, a hydrogen fuel cell includes an anode configured to receive a fuel in the form of hydrogen and a cathode configured to receive an oxidant, such as oxygen or air. Within the fuel cell, the hydrogen reacts with the oxygen in a manner similar to a battery to produce electricity. Oxygen that is not consumed by the fuel cell is expelled therefrom as a cathode exhaust gas C saturated with water which is generated as a by-product during operation of the fuel cell.

In an embodiment, one or more components or subsystems of the cargo container and the transport refrigeration unit 30 are packaged into one or more replaceable modules to allow easy installation, disassembly, and replacement thereof when required. These replaceable modules have mechanical and/or electrical interfaces integrated therein as necessary to allow for quick connect and disconnect functionality of the modules.

Figure 3:
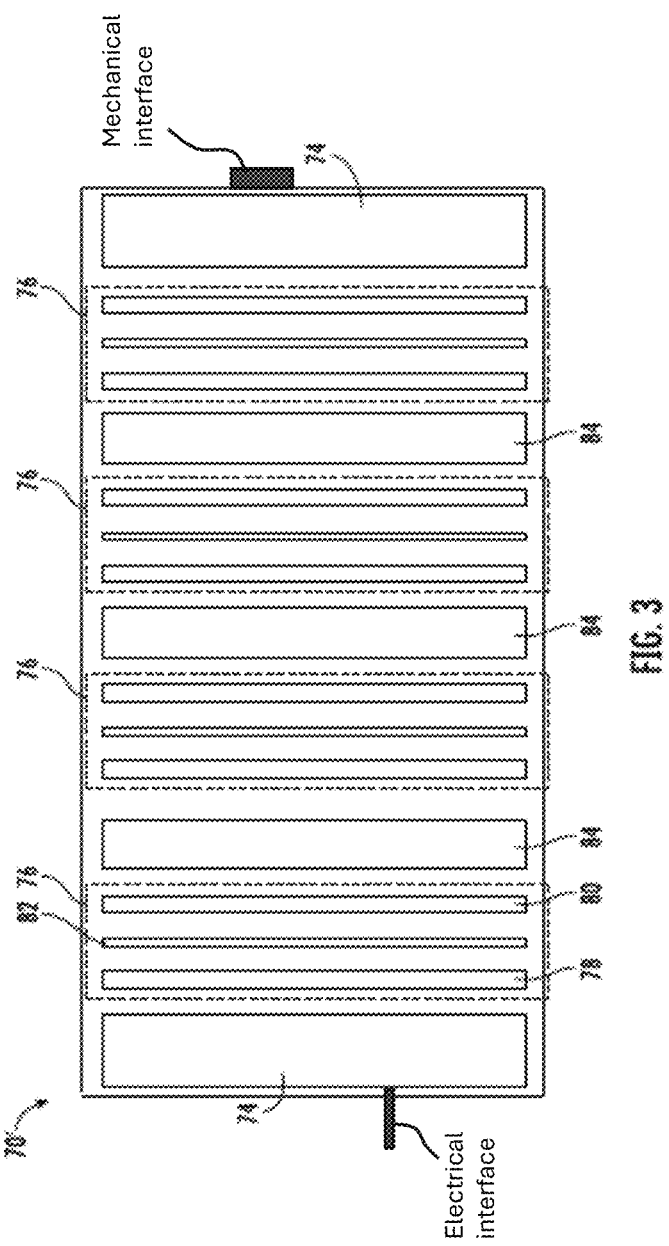
FIG. 3 is a schematic diagram of an exemplary module of the transport refrigeration system according to an embodiment.

In an embodiment, all or at least a portion of the power system 69 is arranged in one or more modular units. With reference now to FIG. 3, an example of such a module is provided. In an embodiment, a fuel cell module 70' has a complete fuel cell contained therein including end plates 74 and the fuel cell stack containing one or more fuel cell packages 76. Each fuel cell package 76 includes an anode 78, a cathode 80, and a membrane or electrolyte assembly 82 positioned between the anode 78 and the cathode 80. Further, in embodiments where the fuel cell stack includes a plurality of fuel cell packages 76, the unit may include one or more bipolar plates 84 positioned between adjacent fuel cell packages 76. Although not shown, in such embodiments, the fuel source 71, such as a source of hydrogen for example, may also, but need not be integrated into the fuel cell module 70'. In embodiments where the module includes a complete fuel cell 70 the fuel source 71, the module 70' may be considered to include an entire power system 69. In an embodiment, the transport refrigeration system includes a plurality of such fuel cell modules 70', thereby creating redundancy in the event of a failure.

Alternatively, the fuel cell module 70' may be configured such that only a portion of the fuel cell 70 is contained therein. For example, each module 70' may include one or more fuel cell packages 76, a portion of a fuel cell package, or a combination of all or a portion of one or more fuel cell packages 76 and a bipolar plate 84. In another embodiment, each module 70' includes only a bipolar plate 84. It should be understood that the total power output from a fuel cell stack can be varied by adjusting the number of fuel cell packages 76 within the stack.

In an embodiment, regardless of whether all or a portion of a fuel cell 70 is provided in a fuel cell module 70', the source or supply of fuel of the power system 69 may be provided in the form of one or more fuel source modules.

In another embodiment, a component, subsystem, plurality of components, or plurality of subsystems of the transport refrigeration unit 30 may be provided as one or more modules. In such embodiments, components that are most susceptible to failure or that require the most frequent maintenance may be arranged within a module. For example, one or more of the compressor 32 and the at least one heat exchanger 34, 38, or any portion thereof, such as a manifold of a heat exchanger for example, may be provided as a module installable within the housing 31 and connectable to the remainder of the components of the vapor compression cycle of the transport refrigeration unit 30.

Figure 4:
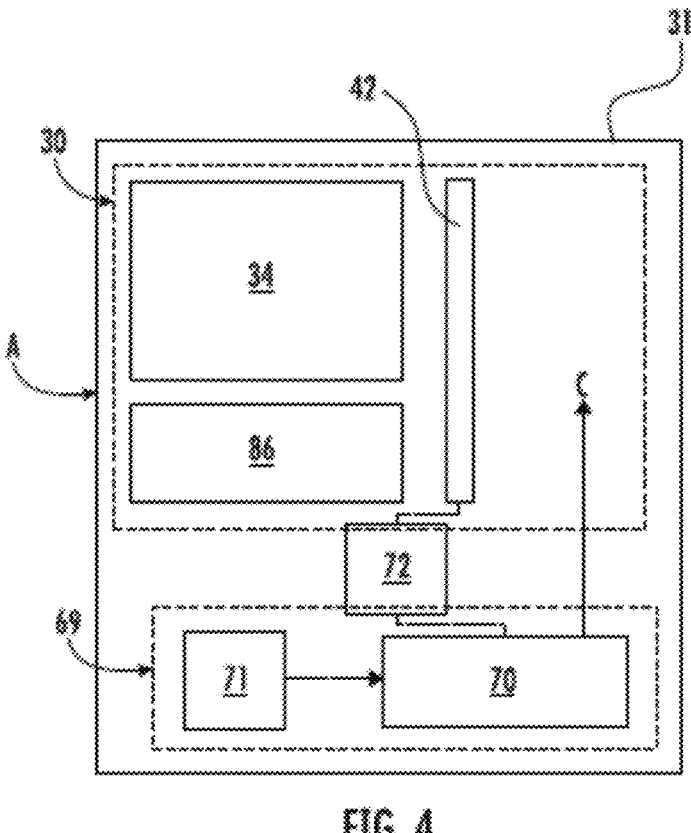
FIG. 4 is a schematic diagram of a transport refrigeration unit and a power system according to an embodiment.

With reference now to FIG. 4, the air flow drawn across the condenser 34 and a radiator 86 and the exhaust gas C output from the power source 70 are expelled into the ambient atmosphere surrounding the transport refrigeration system 20, such as via an opening formed in the housing 31. In an embodiment, this exhaust gas from the power source 70 is conditioned, for example dehumidified and/or heated before being output into the ambient atmosphere. Accordingly, in an embodiment, all or a portion of an exhaust system operable to expel one or more fluid at an exterior of the housing 31 of the transport refrigeration unit 30 may be packaged within one or more modules. For example, a module associated with the exhaust system may include the one or more condenser fan assemblies 42 or a portion thereof. Alternatively, or in addition, a module associated with the exhaust system may include a source used to condition the exhaust gas C from the fuel cell 70 before being exhausted overboard, such as the radiator 86 for example. In other embodiments, all of a portion of an electrical control system and/or a power distribution system of the transport refrigeration unit 30 may be integrated into one or more modules. Further, it should be understood that a module including one or more components of the transport refrigeration unit 30 and one or more components of the power system 69 are within the scope of the disclosure.

By separating or partitioning all or a portion of the transport refrigeration unit 30 and/or all of a portion of power system 69 into smaller modules, the transport refrigeration system 20 may be designed for rapid assembly and or replacement of modules as needed. Such a configuration would result in reduced down time, and therefore increased availability of the transport refrigeration system 20.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A transport refrigeration system comprising:

a refrigeration unit for conditioning an area;

a plurality of replaceable modules, the plurality of replaceable modules including at least one of a quick connect electrical interface and a quick connect mechanical interface and being independently removable from the refrigeration unit;

a power system operably coupled to the refrigeration unit, the power system including at least one fuel cell and a fuel source, wherein the at least one fuel cell of the power system is packaged into a first replaceable module of the plurality of replaceable modules and the fuel source is separate from the first replaceable module; and an exhaust gas system operable to condition an exhaust gas output from the at least one fuel cell, at least a portion of the exhaust gas system being packaged into a second replaceable module of the plurality of replaceable modules.

2. The transport refrigeration system of claim 1, wherein the at least one fuel cell includes a fuel cell stack having a plurality of fuel cell packages and at least one bipolar plate, wherein the replaceable module includes at least a portion of one of the plurality of fuel cell packages.

3. The transport refrigeration system of claim 1, wherein the at least one fuel cell includes a fuel cell stack having a plurality of fuel cell packages and at least one bipolar plate, wherein the replaceable module includes the at least one bipolar plate.

4. The transport refrigeration system of claim 1, wherein the replaceable module includes a component of the refrigeration unit.

5. The transport refrigeration system of claim 4, wherein the refrigeration unit further comprises a plurality of components fluidly coupled to form a closed loop refrigeration circuit.

6. The transport refrigeration system of claim 5, wherein the plurality of components includes a compressor and the replaceable module includes the compressor.

7. The transport refrigeration system of claim 5, wherein the plurality of components includes at least one heat exchanger and the replaceable module includes the at least one heat exchanger.

8. The transport refrigeration system of claim 1, wherein the refrigeration unit further comprises a plurality of subsystems and the replaceable module includes at least one of the plurality of subsystems.

9. The transport refrigeration system of claim 1, wherein the exhaust system further comprises at least one fan assembly.

10. The transport refrigeration system of claim 1, wherein the exhaust system further comprises a source used to condition an exhaust gas of the power system.

11. The transport refrigeration system of claim 1, wherein the refrigeration unit further comprises an electrical control system and the replaceable module includes the electrical control system.

12. The transport refrigeration system of claim 1, wherein the refrigeration unit further comprises a power distribution system and the replaceable module includes the power distribution system.

13. The transport refrigeration system of claim 1, wherein the refrigeration unit includes a plurality of closed loop vapor compression systems, and the replaceable module includes a portion of one of the plurality of closed loop vapor compression systems.

* * * * *